March 22, 1960 A. DINKEL ET AL 2,929,642
APPARATUS FOR STEERING TRAILERS WHEN BACKING
Filed March 24, 1958 4 Sheets-Sheet 1
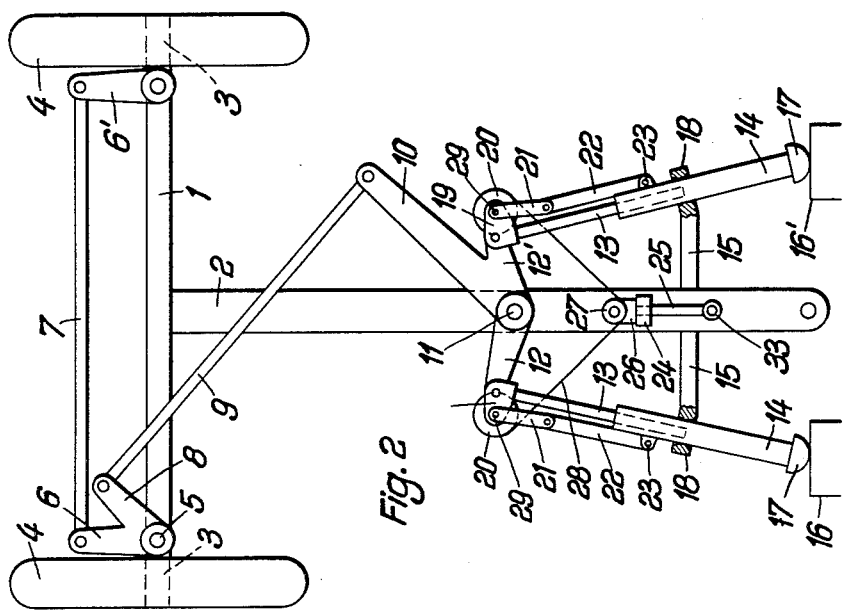
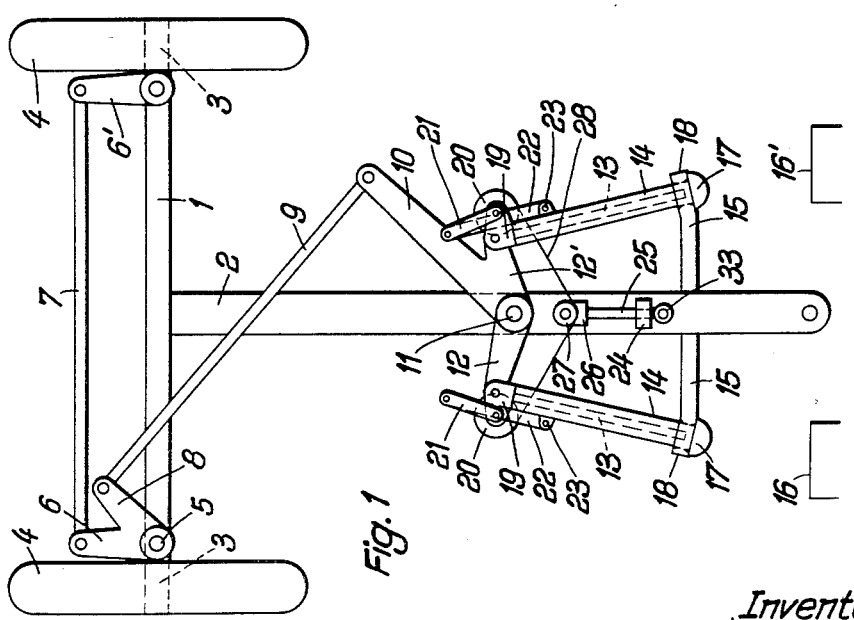
Inventors
A. Dinkel
R. Endress

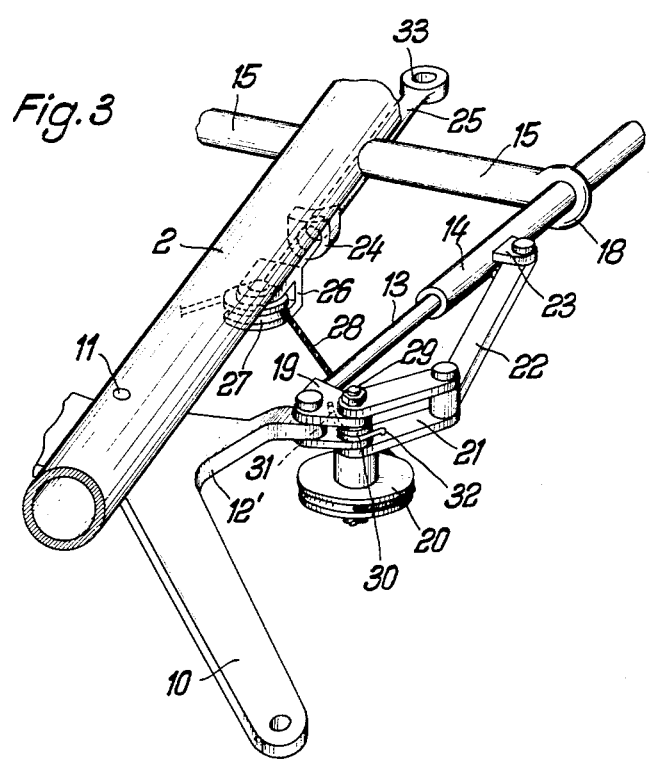

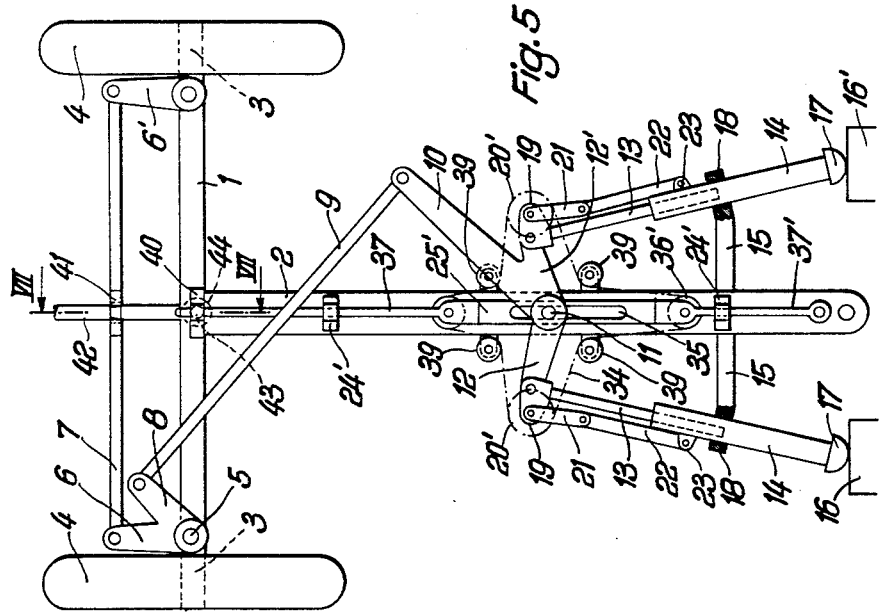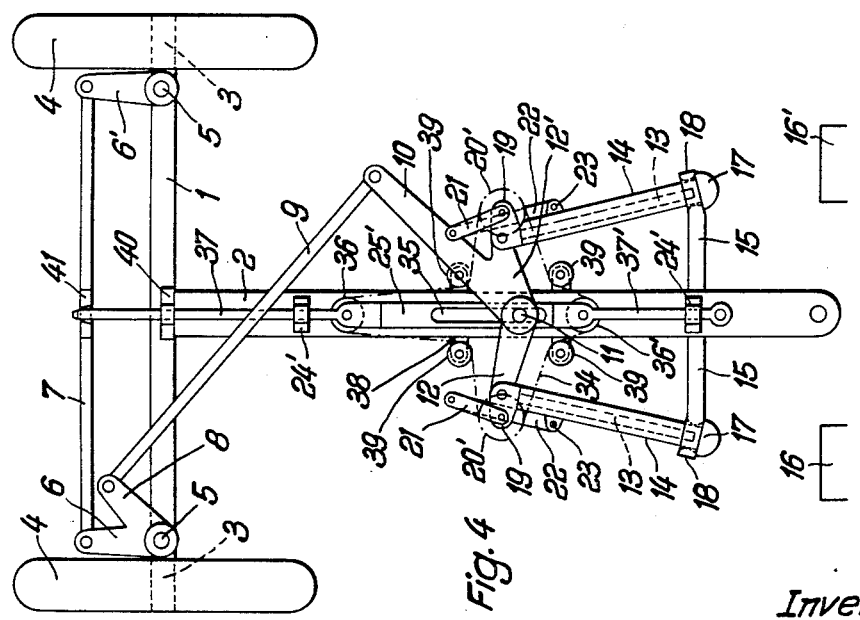

March 22, 1960 A. DINKEL ET AL 2,929,642
APPARATUS FOR STEERING TRAILERS WHEN BACKING
Filed March 24, 1958 4 Sheets-Sheet 4
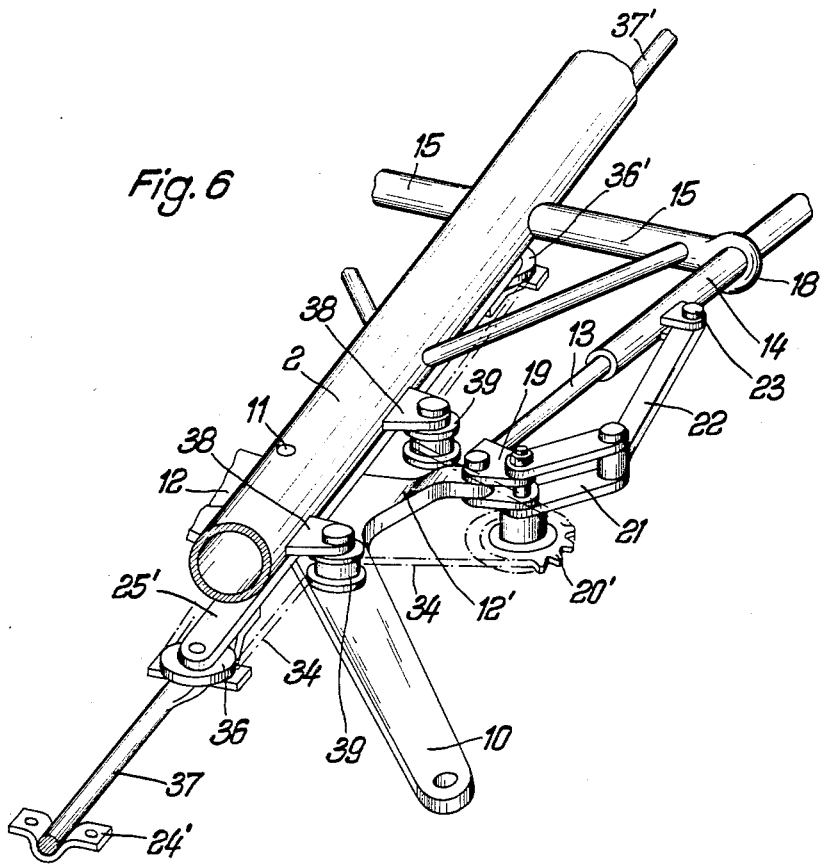
Fig. 6
Fig. 7
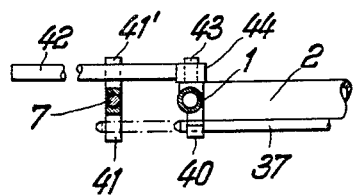
Inventors
A. Dinkel
R. Endress

United States Patent Office 2,929,642
Patented Mar. 22, 1960

2,929,642

APPARATUS FOR STEERING TRAILERS WHEN BACKING

Anton Dinkel, Wertheim (Main), and Rudi Endress, Lindelbach, near Wertheim (Main), Germany, assignors to Anton Dinkel and Kurt Dinkel, both of Wertheim (Main), Germany Application March 24, 1958, Serial No. 723,564

Claims priority, application Germany March 27, 1957

9 Claims. (Cl. 280—443)

This invention relates to apparatus for steering groups of vehicles comprising a towing vehicle and a trailer, when travelling in reverse, in which the towing vehicles are provided at the rear with two buffer surfaces arranged symmetrically with respect to the vertical longitudinal central plane of the vehicle.

The invention relates particularly to a known steering apparatus of this general type in which the wheels of a trailer axle are guided parallel to one another through the intermediary of a track rod and of steering levers connected to the pivotally movable axle journals. The front end of a pull rod extending in the longitudinal direction of the trailer is pivotally attached to the towing vehicle. A three-armed lever is so mounted on a part rigidly connected to the trailer axle as to be rotatable about a vertical pivot in the said longitudinal central plane. One lever arm of the three-armed lever is connected with one steering lever and the other two lever arms thereof project to opposite sides of the pull rod symmetrically with respect to the pull rod when the steering is in the central position. The free end of each of said two arms is pivotally connected to a respective steering rod which is guided in guiding means connected to the pull rod and which is telescopically adjustable in length and of which the other end bears against the associated buffer surface, and thereby effects steering during reverse travel, when the steering rods are in their operative position to which they can be adjusted from the towing machine.

A steering apparatus for reverse travel is known, in which to bring the reverse steering means into or out of operation, it is always necessary first to actuate a brake, then start in the corresponding direction and then again release the brake. Also, the known apparatus is a complicated and costly construction, and yet the wheels of the trailer are not accurately guided either during forward or reverse travel, and therefore have a strong tendency to wobble. Lastly, the known steering apparatus cannot be used for those trailers, for instance, "saddle-support" trailers, in which the front end of the vehicle body of the trailer is directly supported on parts of the towing machine, for instance, on a rotary saddle disc of a semi-trailer, and is secured or pivoted to those parts.

One object of the invention is to solve the problem of further improving the abovementioned known steering apparatus so that for bringing the steering apparatus into or out of operation only a single manual operation, which can be performed in the towing machine is necessary, after which the wheels of the trailer are guided in the required manner, with no tendency to wobble, both during forward and reverse travel.

Another object of the invention is to provide a steering apparatus which is of simple construction, comparatively cheap to manufacture, and nevertheless, will withstand all stresses that arise during travel, without any risk of overstress or premature wear.

Furthermore, another object of the invention is to provide a steering apparatus so constructed as to be capable of being subsequently installed on an existent trailer of any normal type, and more particularly on "saddle-support" trailers in which the front end of the vehicle body of the trailer is directly supported on a rotary saddle disc of the towing machine.

According to the invention, the problem is solved by the combination of the following features, in a steering apparatus of the previously mentioned known type.

The pull rod is rigidly connected to the trailer axle, and the three-armed lever is rotatably mounted on the pull rod; the guiding means of the steering rods consist of holders rigidly connected to the pull rod and having outer loops, and the steering rods can be telescopically pulled into their operative position and pushed into their inoperative position through the loops from the towing machine by means of a traction device, and buffers located at the free ends of the steering rods and stepped to have a greater diameter than these rods are in contact with the buffer surfaces of the towing machine in the operative position, while in the inoperative position these buffers bear against the said loops and thereby lock the three-armed lever in its central position.

It is possible to bring this steering apparatus into its operative position for reverse steering, or into its inoperative position, simply by actuating the traction device once, without having to attend to additional actuation of a brake or to consider the position of the group of vehicles on a hill or slope. Wobbling of the trailer wheels is impossible by the positive locking of the steering apparatus in the inoperative position and by the fact that both steering rods are in contact with the buffers of the towing machine when the steering apparatus is in the operative position. Lastly, since the distance of the trailer wheels from the wheels of the towing machine remains constant, there is no difficulty in installing the steering apparatus on "saddle-support" trailers, which greatly adds to the practical importance of this apparatus.

According to a further feature of the invention, in the region of the free end of each lever arm of the three-armed lever connected to a steering rod, a respective swinging lever is pivoted to that end of a rod of the steering rod and is adapted to be swung through about 180°, in the common plane of the two steering rods, between two end positions lying approximately parallel to the steering rod axis, by means actuatable from the towing machine; the free end of the said swinging lever is pivotally connected to a further lever which is longer than the swinging lever, and the longer lever is pivoted at its other end to an outer tube of the associated steering rod, so that in each of their end positions the two swinging levers adapted to be swung from the towing machine secure the steering rods in their extended operative position or in their retracted inoperative position respectively.

In one embodiment of the invention the swinging lever can be swung through a total angle somewhat greater than 180° and in its two end positions can in each case be swung beyond its straight position so as to be self-locking, whereby simple and reliable locking of the steering rods both in the operative position and also in the inoperative position of the steering apparatus is ensured.

For swinging each swinging lever it is possible to provide for instance a respective cable pulley which is connected to the lever and of which the axis of rotation coincides with the swinging axis, and resiliently acting means which tend to rotate the cable pulleys so as to slide together the two rods of the associated steering rods, while in addition a respective end of a tension cable can be wound on to each cable pulley and secured to the pulley, the cable being connected at its centre to a tension device adapted to be actuated from the towing vehicle. Alternatively in larger trailers and in order to deal with greater stresses, for swinging each swinging lever it is possible to provide a sprocket wheel which is connected to the lever and of which the axis of rotation coincides with the swinging axis; in this case an endless chain passes over the two sprocket wheels and is also guided, between the two sprocket wheels, on a chain guiding apparatus mounted so as to be longitudinally displaceable along the pull rod of the trailer.

This chain drive for the swinging apparatus is pulled in both directions of actuation, so that all yieldingly acting resilient forces can be dispensed with.

Further features of the invention are concerned more particularly with constructional details of the steering apparatus for the swinging apparatus.

Embodiments of the invention chosen by way of example are illustrated in the accompanying diagrammatic drawings, in which:

Figure 1 shows the steering apparatus corresponding to the first embodiment, in the inoperative position, seen from below, Figure 2 shows the same steering apparatus in the operative position, seen from below as in Figure 1, Figure 3 is a perspective elevation of part of the same steering apparatus, seen from above at an angle, on a scale larger than that of Figures 1 and 2, Figure 4 is a diagrammatic elevational view, from below of the steering apparatus corresponding to the second embodiment, in the inoperative position, Figure 5 shows the same steering apparatus in the operative position, seen from below, Figure 6 is a perspective elevation of part of the same steering apparatus, seen from above at an angle, and Figure 7 is a longitudinal section through part of the same apparatus, on line VII—VII of Figure 5.

The frame of a single-axle trailer, of which the other parts are not shown in the drawing, consists essentially of a rigid axle 1 carrying the trailer body through the intermediary of means not shown in the drawing, a pull rod 2 which is rigidly connected to this axle 1 and extends forward in the direction of the longitudinal axis of the trailer, and wheels 4 which are pivotally mounted on the axle 1 through the intermediary of axle journals 3.

The two wheels 4 are guided parallel to one another through the intermediary of an ordinary axle-pivot steering means comprising for each axle journal 3 a respective steering lever 6 and 6' which is rigidly connected to the axle journal and is pivotally movable, together with the journal, about a vertical pivot 5 at the respective end of the axle 1; each steering lever is coupled to the other steering lever 6 or 6' through the intermediary of a track rod 7 pivotally connected to the free ends of the steering levers and extending for instance behind the axle 1, so as to produce parallel guiding. One steering lever (6) is also rigidly connected to a steering arm 8 arranged at an angle of about 45° to the lever; an ordinary steering connecting rod 9 for actuating the axle-pivot steering means is pivotally connected to the free end of the steering arm 8.

In the central position of the wheels 4, shown in the drawing, the steering connecting rod 9 extends obliquely forward, approximately at right angles to the steering arm 8, and the free end of the rod 9 is pivotally connected to a lever arm 10 forming part of the steering apparatus. This arm 10 forms part of a three-armed lever which is mounted on the pull rod 2 of the trailer so as to be pivotally movable about a vertical pivot 11. In the central position of the wheels 4, shown in the drawing, the other two arms 12 and 12' of this three-armed lever extend to opposite sides of the pull rod 2, symmetrically with respect to the rod 2, and are made entirely similar to one another, whereas the lever arm 10 which is substantially longer than these lever arms 12 and 12' is approximately twice as long as the steering arm 8 of the steering lever 6.

Each lever arm 12 and 12' of the three-armed lever is pivotally connected, at its free end, to a respective rod 13 (cf. Figure 2) which extends obliquely forward and outward from the respective lever arm and has a free end projecting into a tube 14 which is longitudinally displaceably mounted on a holding device 15 secured to the pull rod 2. The direction of each rod 13 and tube 14, together forming a steering rod of the steering apparatus extend towards a respective one of two buffer surfaces 16 and 16' of the towing vehicle which is coupled to the trailer and of which the other parts are not shown in the drawing. Also, each tube 14 is provided at its front end with a buffer 17 of which the diameter is greater than the tube diameter and also greater than the outer eye 18 of the holding device 15 which eye guides the tube 14 with a certain clearance.

In accordance with the first embodiment shown in Figures 1 to 3, each rod 13 is welded, in the region of its point of pivotal connection, to a guiding fork 19 which extends outwards approximately in the direction of the associated lever arm 12 or 12' of the three-armed lever and of which the outer end serves to support a cable pulley 20 rigidly connected to a swinging lever 21 of which the length corresponds to about one half of the distance of the buffers 17 from the respective buffer surfaces 16 and 16' when the rods 13 and 14 are slid one into the other and the pull rod 2 of the trailer extends in the longitudinal direction of the towing vehicle. A further lever 22 is pivotally connected to the free end of the swinging lever 21, and the other end of the lever 22 is pivoted to a suitable bearing point 23 of the associated tube 14. This lever 22 is approximately twice as long as the swinging lever 21, and the swinging apparatus described makes it possible to swing the swinging lever 21 through a little more than 180°, in one end position of the swinging lever 21 (cf. Figure 1), the tube 14 belonging to each swinging apparatus has been pushed so far on to the rod 13 that the buffer 17 of the tube bears against the eye 18 of the holding device 15, and in the other end position (cf. Figure 2) of the swinging lever 21 the tube 14 projects so far as to come into contact with the associated buffer surface 16 or 16' of the towing vehicle or to be immediately in front of the buffer surface.

As shown in Figure 2, when the steering apparatus is ready for operation the distance apart of the two buffers 17 is about twice as great as the distance apart of the points of pivotal connection of the steering rods 13 to the three-armed lever 10, 12, 12' and also the length of the lever arm 10 of the three-armed lever 10, 12, 12', which arm is coupled to the steering connecting rod 9, is about twice as great as the length of the steering arm 8 coupled to the other end of the steering connecting rod 9. These relative dimensions result in an advantageous bearing direction of the steering rods 13 and 14 subjected to pressure from the towing vehicle, when the pull rod 2 swings out, and also, in conjunction with the different lever lengths of the steering arm 8 and the lever arm 10 of the three-armed lever as previously described, produce a clearly defined transmission ratio between the angle of deflection of the pull rod 2 relatively to the longitudinal axis of the towing vehicle, and the angle of deflection of the wheels 4 from their central position, which ratio amounts to about 4:1. Practical experience has shown that this pronounced reverse steering of the wheels 4 ensures satisfactory operation of the steering apparatus without the risk of so-called "rubbing" of the tyres of the trailer on the ground.

On the bottom of the pull rod 2, in a place located in the region of the holding devices 15, is mounted a guide loop 24 for an actuating rod 25 extending along the pull rod 2 towards the towing vehicle; at its end nearest the trailer this rod carries a fork head 26 provided with a cable pulley 27. A cable 28 passes over this cable pulley 27 rotatably mounted in the fork head 26; each end of the cable is secured to one of the two cable pulleys 20, and the cable is made so long that on the one hand it is in contact with the periphery of each of the two cable pulleys 20 over a small looping angle even when the steering rods 13, 14 are pulled one out of the other into the operating position, and on the other hand it also allows the steering rods 13, 14 to be slid one on to the other to the full extent, in which case it is in contact with about 180° more of the periphery of each of the two cable pulleys 20 than when the steering apparatus is in the inoperative position. As is shown in Figure 3, a helical spring 30 is also arranged round the bearing pin 29 of each cable pulley 20 between the two arms of the guiding fork 19; one free end of this spring is fixed in the guiding fork 19, and the other free end of the spring is fixed in the swinging lever 21. The helical spring 30 acts as a torsion spring which stresses the swinging lever 21 and therefore also the cable pulley 20 and tends to rotate the lever and pulley clockwise (in Figure 3) about the bearing pin 29, in such a manner that when the cable 28 is free from tension the swinging lever 21 is automatically swung into the position shown in Figure 1, in which the steering rods 13, 14 are at the same time locked in their contracted position.

Lastly, at the front end of the actuating rod 25 there is also an eye 33 in which for instance a cable (not shown in the drawing) can be engaged; with the aid of this cable the steering apparatus corresponding to the first embodiment can be pulled, for instance from the driver's seat in the towing vehicle, into its operative position (cf. Figure 2) against the action of the springs 30. When this cable is released again, the helical springs 30 bring the steering apparatus back, in the manner described, into its inoperative position (cf. Figure 1) in which the axle-pivot steering of the wheels 4 is at the same time locked in its central position.

In the steering apparatus corresponding to the second embodiment, shown in Figures 4 to 7, each rod is welded, in the region of its point of pivotal attachment, to a guide fork 19 which extends outwards approximately in the direction of the associated lever arm 12 or 12' and of which the outer end serves to support a sprocket wheel 20' rigidly connected to the swinging lever 21. Two guide loops 24' are welded to the bottom side of the pull rod 2 at a certain distance from one another, one on each side of the three-armed lever; these loops serve to guide a guiding apparatus 25' for a chain 34 which is guided in a closed ring over the two sprocket wheels 20' and other members. This guiding apparatus 25' consists essentially of a bar which has a longitudinal slot 35 accommodating the pivot 11 of the three-armed lever and which carries at its opposite ends rotatable or fixed circular discs 36, 36' and at each end merges, adjacent to the disc, into a respective rod 37 and 37'; these rods are used for slidably supporting the guiding apparatus on the bottom side of the pull rod 2.

Also, for guiding rollers 39 are mounted on both sides of and immediately adjacent to the pull rod 2, and also on both sides of the two lever arms 12, 12' of the three-armed lever, by means of suitable bearing lugs 38 secured to the pullrod 2; the distance between these rollers in the longitudinal direction of the pull rod is so great that the lever arms 12 and 12' of the three-armed lever which are disposed between the rollers can make, without hindrance, all the swinging movements that are required in practice. The aforesaid chain 34 extends over the outer peripheral surfaces, relatively to the guiding device 35', of the circular discs 36 and 36' and the sprocket wheels 20' and also over the peripheral part of each of the rollers 39 facing the pull rod 2; the rollers 39 are used for additionally guiding the chain 34.

Figures 4 and 5 in conjunction with the perspective elevational view in Figure 6 clearly show how by longitudinal displacement of the guiding apparatus 25' relatively to the pull rod 2 the reverse steering apparatus can be brought into the operative position (cf. Figure 5) or else into the inoperative position (cf. Figure 4); the two levers 21 and 22 co-operating with each steering rod 13, 14 are in each case brought into self-locking positions, in which a spontaneous change of the position in which the steering rods have been placed is in each case quite impossible without a further longitudinal movement of the guiding apparatus 25'. The securing of the steering rods 13, 14 can also be effected separately, for instance by means of bolt-locking means as used on doors. Since the two buffers 17 of the tubes 14 also bear against the eyes 18 of the holding device 15 in the inoperative position, the whole steering apparatus is thus at the same time locked in its inoperative position in such a manner that the wheels 4 continue to be guided in their central position. The eyes 18 have so large a clearance with respect to the tubes 14 that in all of the steering deflections that occur in practice the tubes will never jam in the eyes.

As shown more particularly in Figure 4, the rear guiding rod 37 of the guiding apparatus 25' also passes through a loop 40 secured directly to the axle 1 and is so long that when the steering apparatus is in the inoperative position the rod 37 also projects through a fork guide secured to the centre of the track rod 7. This construction ensures that in the inoperative position of the steering apparatus not only the steering connecting rod 9 but also the track rod 7 is locked in its central position, whereby twofold security against unintended deflection of the wheels 4 is provided.

If the reverse steering apparatus corresponding to the second embodiment is used on a so-called saddle-support trailer, then in conjunction with a trailer of this kind the apparatus can also be advantageously used for moving the trailer about after it has been released from the towing vehicle. As is known, saddle-support trailers have at the front only a simple auxiliary truck with relatively small rollers, which are not steerably mounted on this auxiliary truck. If it is required to swing the trailer round, about the front auxiliary truck, from the position in which the trailer is located after removal from the saddle, then it is only necessary to insert a guiding rod 42 (cf. Figure 7) through a fork guide 41' of the track rod 7, opposite the aforesaid fork guide 41, as far as an upwardly projecting pivot pin 43 secured to the axle 1, and to attach the rod 42 to the pin by means of a suitable eye 44. The guiding rod 42 projecting rearwards under the trailer then provides a sufficiently long lever arm to deflect the wheels 4 by hand as required, whereupon the swinging of the trailer can easily be effected.

The steering apparatus described are not restricted to trailers in which the pull rod is rigidly secured to the axle or front axle of the trailer or to the trailer body; such apparatus can also be used in conjunction with a so-called pivoted-bogie steering means normally used on large trailers. In this case the axle, provided with a pivoted bogie steering means coupled to the reverse steering apparatus, must be adapted to be locked in its central position by means of a suitable locking device. Since such locking means can be constructed in any ordinary manner, a separate illustration or description of this modified reverse steering apparatus is not necessary. It is also possible, and within the scope of the invention, to initiate the steering operations by hydraulic or pneumatic means.

Obviously it is also possible to use the above-described steering apparatus in conjunction with trailers having more than one axle. In this case, all the axles of the trailer must be provided with axle-pivot steering systems which are all connected to the steering apparatus of the foremost axle of the trailer so as to act all in the same direction. This co-directional coupling of a plurality of axle-pivot steering systems is also obvious from the known steering systems, so that a separate description of such a construction can be dispensed with.

The above-described guiding apparatus for the chain could be further improved and modified in many respects; for instance, the simple circular discs could be replaced by rotatably mounted sprocket wheels, and casings could be provided which would largely protect the whole swinging and guiding mechanism of the steering apparatus from dirt. In order to prevent loosening of the chain in the case of large angles of deflection, which might give rise to trouble, one of the circular discs could also be yieldingly mounted and subjected to a continuous outwardly directed force and thereby act also as a chain tensioner.

Lastly, with suitable arrangement of the track rod, the above-described reverse steering apparatus can also be used as a forward steering apparatus acting in a similar way.

We claim:

1. An apparatus for steering groups of vehicles including a towing machine and a trailer when traveling in reverse, comprising two buffer surfaces at the rear of the towing vehicle arranged symmetrically respecting the vertical longitudinal central plane of the vehicle, a trailer axle, a wheel pivotally connected to the axle adjacent each end of the axle, a steering lever secured to the pivotal connection of each wheel, tie-bar means connecting the steering levers for maintaining the wheels in parallelism, a pull rod rigidly connected to the axle and extending in the longitudinal direction of the trailer with the free end of the pull rod being adapted to be pivotally connected to the towing vehicle, a three-armed lever mounted on the pull rod for rotation about a vertical axis in the longitudinal central plane, means connecting one arm of said three-armed lever to one of said steering levers, the other two arms of the three-armed lever projecting to opposite sides of the pull rod symmetrically with respect to the pull rod when the wheels are in the central position, a steering rod component located on each side of the pull rod and each component including a member connected to one of said other two arms of the three-armed lever, and a second member movable longitudinally respecting the first named member, holder means rigidly affixed to the pull rod and having an eye at each end thereof for supporting each of said steering rod components, buffer means carried by the free end of each of said second members, the diameter of said buffer means being greater than the diameter of the eye, and traction means operatively connected with said steering rod components and actuated from the towing machine operable to move said second members from an inoperative position in which the buffer means bears against said eyes thereby locking the three-armed lever in its central position lengthwise through the said eyes to an operative position whereby said buffer means contact the buffer surfaces of the towing machine thus effecting steering during reverse travel.

2. A steering apparatus as claimed in claim 1, in which each of said other two arms of the three-armed lever adjacent its connection to said first named member includes a guiding fork secured to such member, a swinging lever pivoted to the guiding fork for movement through an arc of approximately 180° in the common plane of said steering rod component between two end positions lying substantially parallel to the axis of the steering rod component, a further lever of greater length than the swinging lever pivotally connected at one end to the free end of the swinging lever, and means pivotally connecting the free end of said further lever to the second member of the steering rod component whereby in each end position, the swinging lever is swung to secure each steering rod component in its operative or inoperative position, respectively.

3. A steering apparatus as claimed in claim 2, in which said swinging lever is swingable through a total arc somewhat greater than 180° whereby in each end position, the swinging lever is swung beyond its straight position so as to be self-locking.

4. A steering apparatus as claimed in claim 2, further including a cable pulley secured to each swinging lever and coaxial with the pivotal connection between such lever and the guiding fork, spring means associated with said pulley tending to move said pulley and swinging lever so as to move the steering rod component to its inoperative position, cable means trained at least partially about and secured to each cable pulley, and means operably connecting said traction means to the approximate center of the cable means so that operation of the traction means swings the swinging levers against the action of the spring means to move said second members of the steering rod components to their operative positions.

5. A steering apparatus as claimed in claim 2, further including a sprocket secured to each swinging lever and coaxial with the pivotal connection between such lever and the guiding fork, an endless chain trained about said sprockets, chain guide means mounted on said pull rod for longitudinal displacement relative thereto, and means associated with said chain guide means for guiding the chain between the sprockets whereby displacement of said chain guide means moves said steering rod components to the inoperative or operative positions.

6. A steering apparatus as claimed in claim 5, in which the means for guiding the chain includes two circular rollers mounted on the chain guide means with one roller being located forward of and the other roller rearward of the mounting of said three-armed lever for rotation relative to the pull rod, and at a distance from each other in the direction of the axis of the pull rod which is greater than twice the total displacement of the chain guide means.

7. A steering apparatus as claimed is claim 6, further including guiding rollers mounted on the pull rod forward of and rearward of the transverse plane of the three-armed lever on both sides of and immediately adjacent such plane, with the endless chain being guided from said sprockets, over said guiding rollers and thence to said circular rollers.

8. A steering apparatus as claimed in claim 7, further including rods associated with the forward and rearward ends of said chain guide means for guiding the chain guide means on the pull rod, and said tie-bar having a centrally located opening for receiving said rearward rod when the steering rod components are in the operative position.

9. A steering apparatus as claimed in claim 7, in which said tie-bar is provided with a guiding element on its upper surface at its longitudinal center point, pivot pin means on said axle at its longitudinal center point, a guiding rod means extending through said guiding element, and an eye on one end of the guiding rod means embracing said pivot pin means.

References Cited in the file of this patent
UNITED STATES PATENTS

| 1,955,178 | Elwood | Apr. 17, 1934 |
| 2,127,057 | Drake | Aug. 16, 1938 |
| 2,608,417 | Kelsey | Aug. 26, 1952 |